US009477767B1

(12) United States Patent
Finkelstein et al.

(10) Patent No.: US 9,477,767 B1
(45) Date of Patent: *Oct. 25, 2016

(54) DEMOTION OF ALREADY OBSERVED SEARCH QUERY COMPLETIONS

(71) Applicant: Google Inc., Mountain View, CA (US)

(72) Inventors: Lev Finkelstein, Haifa (IL); Gilad Benjamin, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/625,321

(22) Filed: Feb. 18, 2015

Related U.S. Application Data

(63) Continuation of application No. 13/408,398, filed on Feb. 29, 2012, now Pat. No. 8,972,388.

(51) Int. Cl.
*G06F 7/00* (2006.01)
*G06F 17/30* (2006.01)
*G06F 3/023* (2006.01)

(52) U.S. Cl.
CPC ....... *G06F 17/30867* (2013.01); *G06F 3/0237* (2013.01); *G06F 17/3053* (2013.01); *G06F 17/30864* (2013.01)

(58) Field of Classification Search
CPC ................... G06F 17/30864; G06F 17/3064; G06F 3/0237
See application file for complete search history.

(56) References Cited

U.S. PATENT DOCUMENTS

| | | | | |
|---|---|---|---|---|
| 7,111,248 B2* | 9/2006 | Mulvey | ................ | G06F 3/0237 345/156 |
| 7,382,358 B2* | 6/2008 | Kushler | ................ | G06F 3/0237 345/168 |
| 7,466,859 B2* | 12/2008 | Chang | ..................... | G06F 3/018 341/22 |
| 7,890,526 B1* | 2/2011 | Brewer | ............... | G06F 17/3097 707/767 |
| 8,645,362 B1* | 2/2014 | Jain | ................... | G06F 17/30864 707/723 |
| 2006/0206454 A1* | 9/2006 | Forstall | ............ | G06F 17/30864 707/3 |
| 2008/0100579 A1* | 5/2008 | Robinson | .............. | G06F 3/0219 345/168 |

* cited by examiner

*Primary Examiner* — Marc Somers
(74) *Attorney, Agent, or Firm* — Middleton Reutlinger

(57) ABSTRACT

Methods, systems, and apparatus are described that include receiving a sequence of one or more characters representing a first partial query entered into a search field on a computing device. A first list of query completions for the first partial query is provided for display on the computing device. One or more additional characters are then entered into the search field, where the sequence of characters and the additional characters cumulatively represent a second partial query. A second list of query completions are then obtained for the second partial query, and one or more query completions appearing in the first and the second lists are identified. Demotion scores for the identified query completions are then calculated which are used to demote the identified query completions to a lesser position within the second list, thereby forming a refined second list for display on the computing device.

19 Claims, 6 Drawing Sheets

DEMOTION OF ALREADY OBSERVED SEARCH QUERY COMPLETIONS

BACKGROUND

The present disclosure relates to query processing.

Information retrieval systems, especially Internet search engines, help users by retrieving information, such as web pages, images, text documents and multimedia content, in response to queries. Search engines use a variety of signals to determine the relevance of the retrieved content to the user's query.

Formulating a query that accurately represents the user's informational need can be challenging. Search engines may suggest queries to the user, to help the user. Some search engines provide suggested query completions to the user as the user is typing a query, essentially completing the query by typing ahead for the user.

It is desirable to provide improved techniques for providing query completions that are likely to assist the user in completing a query.

SUMMARY

In one implementation, a method is described that includes receiving a sequence of one or more characters entered into a search field on a computing device. The sequence of characters represents a first partial query. The method also includes providing a first list of query completions for the first partial query for display on the computing device. The method also includes receiving one or more additional characters entered into the search field upon display of the first list. The sequence of characters and the additional characters cumulatively represent a second partial query. The method further includes obtaining a second list of query completions for the second partial query. One or more query completions in the second list that appear in the first list are then identified. Demotion scores are then calculated for the identified query completions. A demotion score for a particular identified query completion is based at least in part on a period of time between when the first list was displayed and when the additional characters were entered. The demotion scores are then used to demote one or more of the identified query completions to a lesser position within the second list, thereby forming a refined second list. The refined second list of query completions is then provided for display on the computing device.

This method and other implementations of the technology disclosed can each optionally include one or more of the following features.

The demotion scores can be further based on respective positions of the identified query completions within the displayed first list of query completions.

The first list of query completions can be displayed within a menu beneath the search field. The demotion score for the particular identified query completion can then be based on whether the particular identified query completion was provided for display at or above a threshold position within the menu. This threshold position can be a second position beneath the search field.

The demotion score for the particular query completion can be based on whether the period of time that the first list was displayed exceeds a minimum threshold time.

The method can further include receiving one or more further characters entered into the search field upon display of the refined second list. The second partial query and the further characters represent a third partial query. A third list of query completions for the third partial query can then be obtained. One or more query completions in the third list that appear in the refined second list can then be identified. Demotion scores can then be calculated for the identified query completions in the third list. A demotion score for a given identified query completion in the third list can be based at least in part on a second period of time between when the refined second list was displayed and when the further characters were entered. The demotion scores for the identified completions in the third list can then be used to demote one or more of the identified query completions to a lesser position in the third list, thereby forming a refined third list. The refined third list of query completions can then be provided for display on the computing device.

The given identified query completion in the third list can further appear in the first list, and the demotion score for the given identified query completion can be further based on the period of time between when the first list was displayed and when the additional characters were entered.

The one or more additional characters can be a single character.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Particular implementations of the subject matter described herein dynamically refines lists of query completions as a user is typing a query, in a manner that demotes query completions that may have already been observed by the user during the current query entry process. The demotion of the previously observed query completions allows additional query completions to be provided that can more likely assist the user in completion of the query. As a result, meaningful query completions can be provided which can assist users in finding the information they seek.

Particular aspects of one or more implementations of the subject matter described in this specification are set forth in the drawings and the description below. Other features, aspects, and advantages of the subject matter will become apparent from the description, the drawings, and the claims.

DETAILED DESCRIPTION

Figure 1:
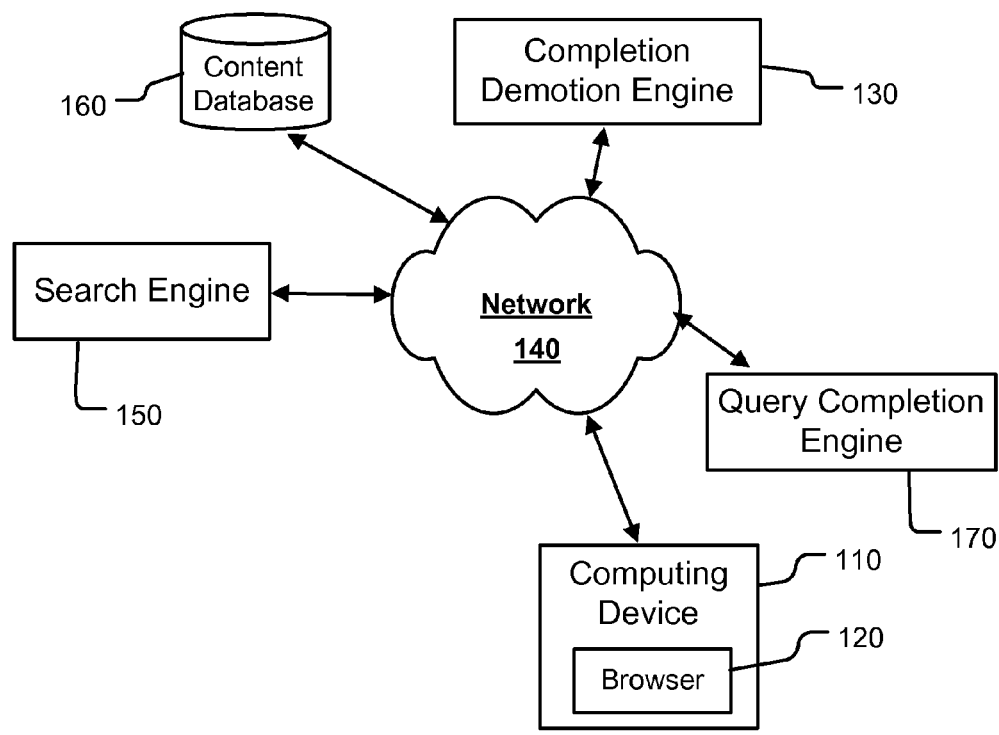
FIG. 1 illustrates a block diagram of an example environment in which dynamically refining lists of query completions during the query entry process can be used.

The technology described refines lists of query completions as a user is typing a query, in a manner that demotes query completions that may have already been observed by the user during the current search query entry process. The demotion of already observed query completions allows additional query suggestions to be provided that may more likely assist the user in completion of the query. As a result, meaningful query suggestions can be provided which can assist users in finding the information they seek.

The technology includes refining lists of query completions across a series of partial queries that cumulatively represents the input process of a single search query into a search field. A partial query is a query formulated by a user prior to an explicit request from the user to submit the query.

A given partial query in the series is cumulative because it corresponds to the characters that the user has entered through a given instance in time. As the user enters additional characters to further define the search query, these additional characters along with the already entered characters define an ensuing partial query in the series.

As an example, the series of partial queries that correspond to a query input process includes entry of the sequence of characters "f"-"l"-"o"-"w"-"e"-"r" can include partial queries "f", "fl", "flo", "flow", "flowe" and "flower". In this example, successive partial queries in the series differ by a single character. Successive partial queries in the series may also differ by more than one character.

As described below, the list of query completions for a given partial query in the series is "refined" by demoting query completions to lesser positions within the list which have already been displayed to the user for a preceding partial query in the series. These already displayed query completions are demoted based on the period of time that they were displayed to the user during the current query input process. In doing so, additional query completions that may represent the user's informational need can be more prominently displayed to the user, as the user continues to enter characters.

The technology includes obtaining an initial list of query completions for a given partial query that represents the character(s) the user has entered so far. Conventional or other techniques may be used to determine the query completions in the initial list. For example, prefix based matching may be used to determine the initial list of query completions.

The query completions in the initial list are ranked based on initial ranking scores. The initial ranking scores may for example be calculated using conventional techniques. For example, the initial ranking scores may be based on popularity of the completions. In one implementation, popularity is determined based on frequency with which past users have submitted the query completions as complete queries.

Query completions in the initial list are then identified which have been already displayed as query completions for preceding partial queries in the series. In other words, the identified query completions have already been displayed to the user during the current query input process, but not selected by the user.

Demotion scores are then calculated for the identified query completions. A demotion score for a particular identified query completion is based at least in part on a period of time it has already been displayed to the user during the current query entry process. The demotion score of the particular query completion thus represents an extent to which the user may have observed it, and decided not to select it. In other words, the demotion score indicates the likelihood that the particular identified query completion does not represent the informational need of the user.

The initial list can then be refined by re-ranking the query completions based at least in part on the demotion scores, such that the previously displayed query completions may be demoted to a lesser position in the list, or even demoted off of the list. The query completions may for example be re-ranked by calculating revised ranking scores using the demotion scores. The revised ranking score for a given query completion in the list may be a function of its initial ranking score and its demotion score.

Query completions in the refined list can then be selected and provided for display to the user based at least in part on their refined ranking. For example, a predetermined number of the highest ranked query completions in the refined list may be provided for display to the user. The final refined list of query completions may be displayed within a cascaded drop menu of the search field of an application, such as a web browser, executing on the user's computing device as the user is typing the query.

The user can then select one of the displayed query completions in the final refined list, or if not satisfied with those, may enter one or more additional characters. These additional characters may also include edit operations performed by the user, such as entering a backspace or entering characters in between already entered characters. If the user enters one or more additional characters, thereby producing a new partial query in the series, a new list of query completions can then be obtained and revised by demoting previously provided query completions within the new list.

FIG. 1 illustrates a block diagram of an example environment 100 in which demoting previously displayed query completions can be used. The environment 100 includes a client computing device 110 and a search engine 150. The environment also includes a communication network 140 that allows for communication between various components of the environment 100.

During operation, a user interacts with the search engine 150 through the client computing device 110. The client computing device 110 and the search engine 150 each include memory for storage of data and software applications, a processor for accessing data and executing applications, and components that facilitate communication over the communication network 140. The computing device 110 executes an application, such as web browser 120, which provides a search field that allows the user to formulate complete queries and submit them to the search engine 150.

The user may indicate completion of the query by entering a carriage return or other equivalent character. As another example, the user may indicate completion of the query by selecting a search button in a user interface presented to the user during entry of the query. As yet another example, the user may indicate completion of the query by saying a command in a speech interface or pausing for more than a predetermined period of time. In implementations in which search results are displayed as the user is typing the query, the user may also indicate completion by selecting a search result.

The search engine 150 receives a complete query from the computing device 110, and executes the queries against a content database 160 of available resources such as Web pages, images, text documents and multimedia content. The search engine 150 identifies content in the database 160 which matches the queries, and responds by generating search results which are transmitted to the computing device 110 in a form that can be presented to the user. For example, the search engine 150 may transmit a search results web page to be displayed in the web browser 120 executing on the computing device 110.

During the query input process by the user, the web browser 120 or other application executing on the client computing device 110 also transmits a series of one or more partial queries to a query completion engine 170. The query completion engine 170 includes memory for storage of data and software applications, a processor for accessing data and executing applications, and components that facilitate communication over the communication network 140.

The series of partial queries cumulatively represent the input process of a single search query into a search field. A partial query is a query formulated by the user prior to an explicit request from the user to submit the query.

A given partial query in the series is cumulative because it corresponds to the characters that the user has entered through a given instance in time. As the user enters additional characters which further define the user's search query, these additional characters, along with the already entered characters, produce an ensuing partial query in the series.

In some implementations, the web browser 120 transmits an entirely new partial query to the query completion engine 170 upon entry of one or more additional characters into the search field. In other implementations, the web browser 120 transmits only the additional characters that have been entered since transmission of a preceding partial query of the current query input process. In such a case, the query completion engine 170 or the completion demotion engine 130 (described below) can add the additional characters to the already entered characters to form the new partial query. The web browser 120 may transmit each character as it is being typed or otherwise entered by the user into the search field. Alternatively, multiple characters at a time may be provided following a pause between the entry of characters, or once a predetermined number of characters have been entered.

The query completion engine 170 forwards the partial query, or the additional characters that have been typed since transmission of a preceding partial query, to the completion demotion engine 130. The completion demotion engine 130 may be implemented in hardware, firmware, or software running on hardware. The completion demotion engine 130 stores session information for the current query input process by the user. The session information includes the lists of query completions, if any, which have already been provided for display to the user during the current query input process. The session information also includes an "exposure time" for each of the prior lists of query completions. The exposure time represents a period of time that a corresponding prior list of query completions was displayed to the user during the current query input process. The exposure time can be calculated as the time between when the corresponding prior list of query completions was displayed to the user, and when the user entered one or more additional characters.

The completion demotion engine 130 operates in conjunction with the query completion engine 170 to provide refined lists of query completions during the current query input process by the user.

In response to the partial query, the query completion engine 170 transmits an initial list of suggested query completions for the partial query to the completion demotion engine 130. The query completion engine 170 may use conventional or other techniques to determine the suggested query completions to include in the initial list. For example, the query completion engine 170 may use prefix based matching. The query completion engine 170 may also use other techniques to determine the suggested query completions. The initial list of query completions for the partial query may be stored in a query completion tree (described below) or other data structure maintained by the query completion engine 170.

The query completion engine 170 may also provide initial ranking scores that were used to determine the initial positions of the suggested query completions in the initial list. The initial ranking scores may for example be based on popularity. In one implementation, popularity is determined based on the frequency with which past users submitted the suggested query completions as complete queries.

If the partial query is the first partial query that has been received during the current query input process by the user, the completion demotion engine 130 forwards the query completions within the initial list to the computing device 110 in a form that can be displayed to the user. The list of query completions may for example be displayed within a cascaded drop down menu of the search field of an application, such as the web browser 120, executing on the user's computing device as the user is typing the query.

The user can then select one of the displayed query completions for submission to the search engine 150, so that search results can be obtained. Upon selection of a displayed query completion by the user, the search engine 150 may for example transmit a search results web page to be displayed in the web browser 120 executing on the client computing device 110. Alternatively, if the user is not satisfied with the displayed query completions, the user may enter one or more additional characters into the search field, in order to further define the search query.

If the received partial query is not the first partial query of the current query input process, the completion demotion engine 130 analyzes the stored session information of associated with the current query input process by the user. In particular, the completion demotion engine 130 determines whether one or more query completions in the initial list have already been displayed to the user during the current query input process. These already displayed query completions are identified by comparing the initial list of query completions to the stored lists of query completions for each of the preceding partial queries.

The completion demotion engine 130 then calculates demotion scores for the identified query completions in the initial list. The demotion score for a particular identified query completion is based at least in part on a period of time that it has already been displayed to the user during the current query entry process. This period of time can be based a sum of the stored individual exposure times for each of the stored lists of query completions that include the particular query completion.

In some implementations, the demotion score for the particular query completion is further based on the position(s) of the particular query completion within the stored list(s) previously displayed to the user during the current query input process. For example, the lists of query completions may be displayed within a cascade drop down menu beneath the search field as the user is entering the query. In such a case, the demotion score may be assigned a value based on how close it was displayed to the search field. For example, the demotion score may be assigned the lowest value (e.g. '0') if the particular query completion is displayed closest to the search field, and may be assigned the highest value (e.g. '1') if it is displayed furthest away from the search field. In doing so, the demotion score can be assigned a value to indicate an increased likelihood that the user observed the particular query completion the closer it is displayed to the search field, and chose not to select it.

In some implementations, the demotion score for the particular query completion is based on whether the particular query completion was displayed at or above a threshold position within the drop-down menu. The threshold position may for example be the first or second position displayed within the cascaded drop down menu beneath the search field. If the particular query suggestion was displayed above the threshold position but not selected, the demotion score may be assigned a value to indicate an increased likelihood that the user observed the particular query completion, and chose not to select it.

The demotion score for the particular query completion may also be based on whether the period of time it has been displayed to the user exceeds a minimum threshold time. In such a case, the demotion score may be assigned the highest value (e.g. '1') if the period of time does not exceed the minimum threshold time. The minimum threshold time may be for example 300, 400, 500, 700 or 1000 milliseconds.

The demotion score for the particular query completion may also be based on whether the period of time is has been displayed to the user exceeds a maximum threshold time. In such a case, the demotion score may be assigned the lowest score (e.g. '0') if the period of time exceeds the maximum threshold time. The maximum threshold time may be for example 5, 7, 10 or 12 seconds.

In one implementation, the demotion score is calculated using the following equation:

$$DS(QC_i) = exp^{-(\lambda \cdot t_i)} \quad (Eq. 1)$$

where DC is the demotion score for query completion $QC_i$, $t_i$ is the cumulative period of time that query completion $QC_i$ has already been displayed to the user during the current query entry process, and $\lambda$ is a constant.

Alternative implementations may use other techniques for calculating the demotion scores.

The completion demotion engine 130 then refines the initial list of query completions by re-ranking the query completions based at least in part on the demotion scores. In doing so, the previously displayed query completions may be demoted to a lesser position in the list, depending on their demotion scores. The query completions may for example be re-ranked by calculating revised ranking scores using the demotion scores. The revised ranking score for a given query completion may for example be a function of its initial ranking score and its demotion score.

The completion demotion engine 130 then selects query completions in the refined list based at least in part on their revised rankings. For example, a predetermined number of the highest ranked query completions in the refined list may be selected.

The completion demotion engine 130 then provides the selected query completions to the client computing device 110 for display to the user. The selected query completions may for example be displayed within a cascaded drop down menu of the search field of an application, such as the web browser 120, executing on the user's computing device 110 as the user is typing the query.

The user can then select one of the displayed query completions, or if not satisfied with the displayed query completions, may continue to enter one or more additional characters. As the user enters the additional characters, thereby formulating a new partial query of the current query input process, an additional list of query suggestions may be obtained and revised to demote previously provided query completions in a similar manner as that described above.

In some implementations, the completion demotion engine 130 may also obtain search results for the highest ranked query completion in the refined list from the search engine 150. The completion demotion engine 130 can then provide the search results to the client computing device 110 for display to the user, as the refined list is also displayed. In such a case, as the user continues to enter additional characters, the demotion score for a particular query completion may be further based on a period of time that its search results have been displayed to the user during the current query entry process.

The network 140 facilitates communication between the various components in the environment 100. In one implementation, the network 140 includes the Internet. The network 140 can also utilize dedicated or private communication links that are not necessarily part of the Internet. In one implementation, the network 140 uses standard communications technologies, protocols, and/or inter-process communication techniques.

Many other configurations are possible having more or less components than the environment 100 shown in FIG. 1. For example, the environment 100 can include multiple search engines. The environment 100 can also include many more computing devices that submit queries to the search engines. In some implementations, the completion demotion engine 130 and the query completion engine 170 may be components of the search engine 150.

Figure 2:
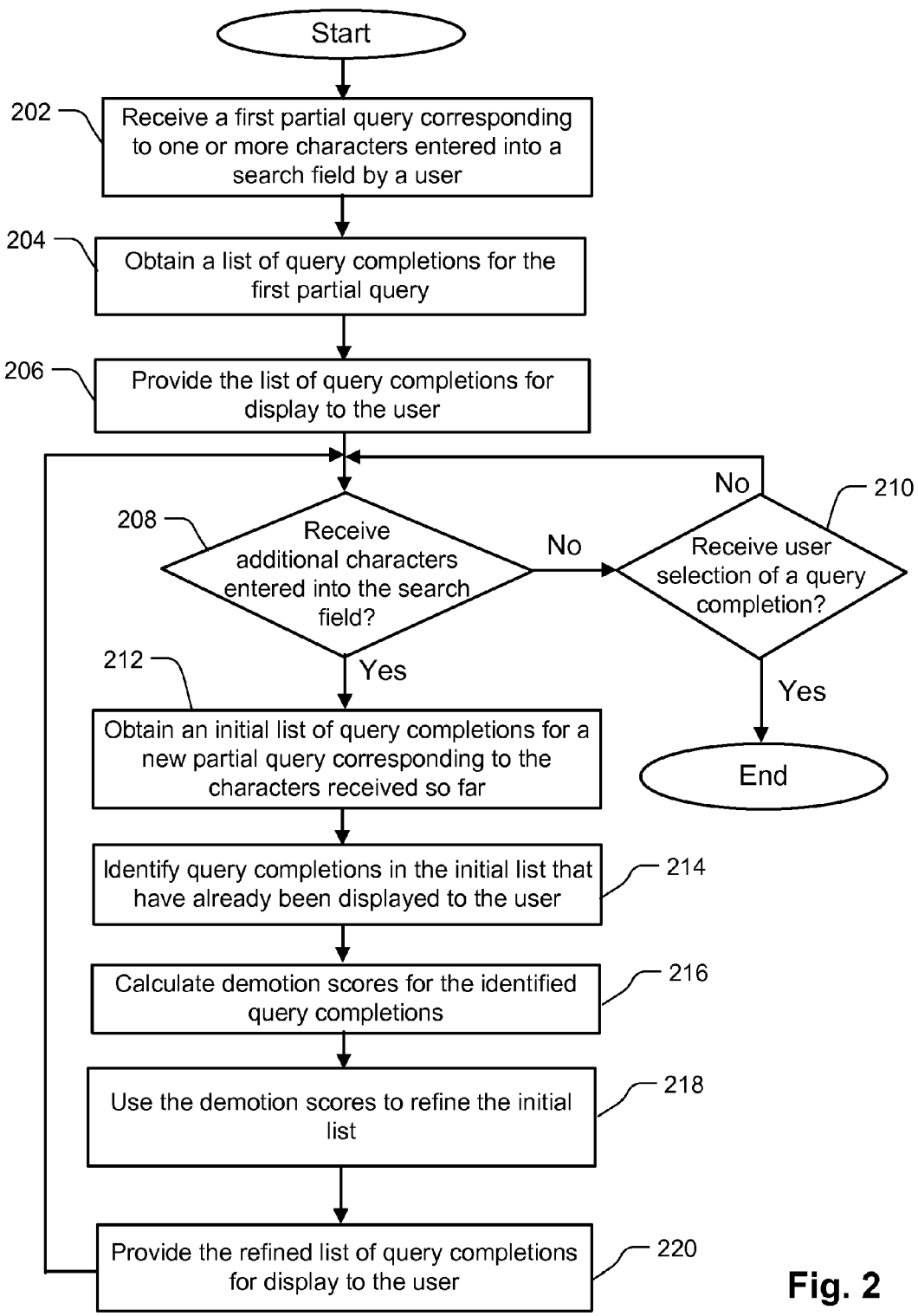
FIG. 2 is a flow chart illustrating an example process for dynamically refining lists of query completions during the query entry process.

FIG. 2 is a flow chart illustrating an example process for dynamically refining lists of query completions during the query entry process. Other embodiments may perform the steps in different orders and/or perform different or additional steps than the ones illustrated in FIG. 2. For convenience, FIG. 2 will be described with reference to a system of one or more computers that performs the process. The system can be, for example, the completion demotion engine 130 described above with reference to FIG. 1.

At step 202, the system receives a first partial query corresponding to one or more characters entered into a search field by a user. At step 204, the system obtains a list of query completions for the partial query. At step 206, the system provides the list of query completions for display to the user.

The system then waits for additional characters to be entered into the search field (208), or for user selection of a displayed query completion (210).

Upon receiving one or more additional characters entered into the search field by the user, the process continues to step 212. At step 212, the system obtains an initial list of query completions for a new partial query that corresponds to the characters that have been received so far. In other words, the new partial query is the combination of the characters in the first partial query, and additional characters that have been entered by the user.

At step 214, the system identifies one or more query completions in the initial list that have already been displayed to the user during the current query input process. These already displayed query completions are identified by comparing the initial list of query completions to the list(s) of query completions for each preceding partial query associated with the current query input process.

At step 216, the system calculates demotion scores for the identified query completions. The demotion score for a particular identified query completion is based at least in part on a period of time it has already been displayed to the user during the current query entry process. This period of time is based a sum of the individual exposure times for each already displayed list of query completions that include the particular identified query completion. The demotion scores can be calculated using the techniques described above.

At step 218, the system uses the demotion scores to modify the positions of one or more of the identified query completions within the initial list, thereby creating a refined list.

At step 220, the system then provides the refined list of query completions for display to the user. The system then waits for additional characters to be entered into the search field (208), or for user selection of a displayed query completion (210). Upon receiving additional characters, the system then repeats the steps 212, 214, 216, 218 and 220 based on the characters that have been entered by the user so far.

Figure 3:
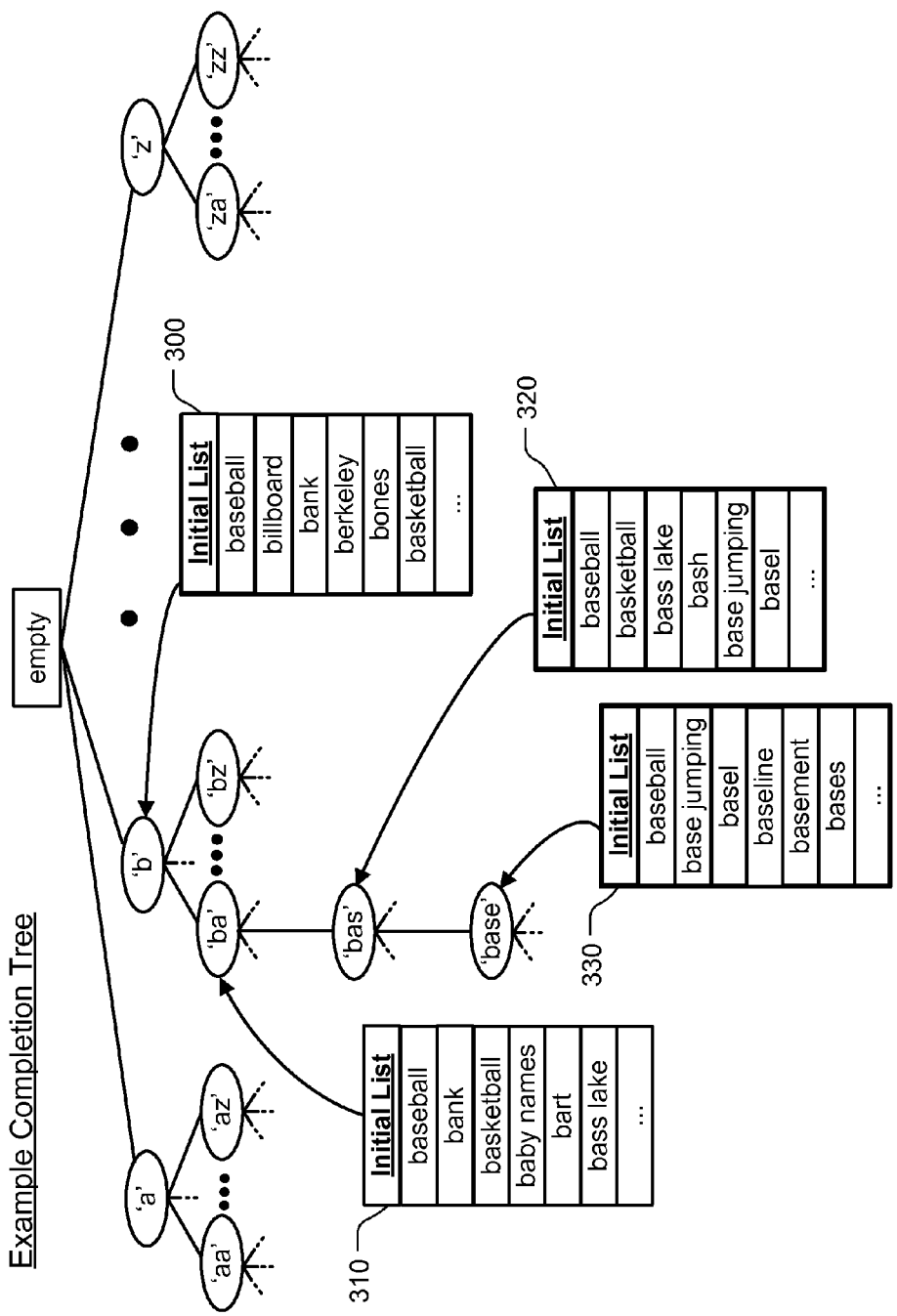
FIG. 3 illustrates an example completion tree that may be used to store initial lists of query completions.

FIG. 3 illustrates an example of a query completion tree that can be maintained by the query completion engine 170 in some implementations. The query completion tree includes nodes corresponding to different partial queries. Each node is associated with a corresponding initial list of query completions that are arranged in order based on initial ranking scores computed by the query completion engine 170. In this example, prefix based matching has been used to determine the query completions that are included in the initial lists.

FIG. 3 includes an example of the initial lists of query completions for a typing sequence that includes the characters "b"-"a"-"s"-"e". In this example, the partial query "b" is associated with the initial list 300 of query completions, the partial query "ba" is associated with the initial list 310 of query completions, the partial query "bas" is associated with the initial list 320 of query completions, and the partial query "base" is associated with the initial list 330 of query completions. As shown in FIG. 3, the query completion "baseball" has the highest initial ranking in each of the initial lists 300, 310, 320, 330.

Figure 4:
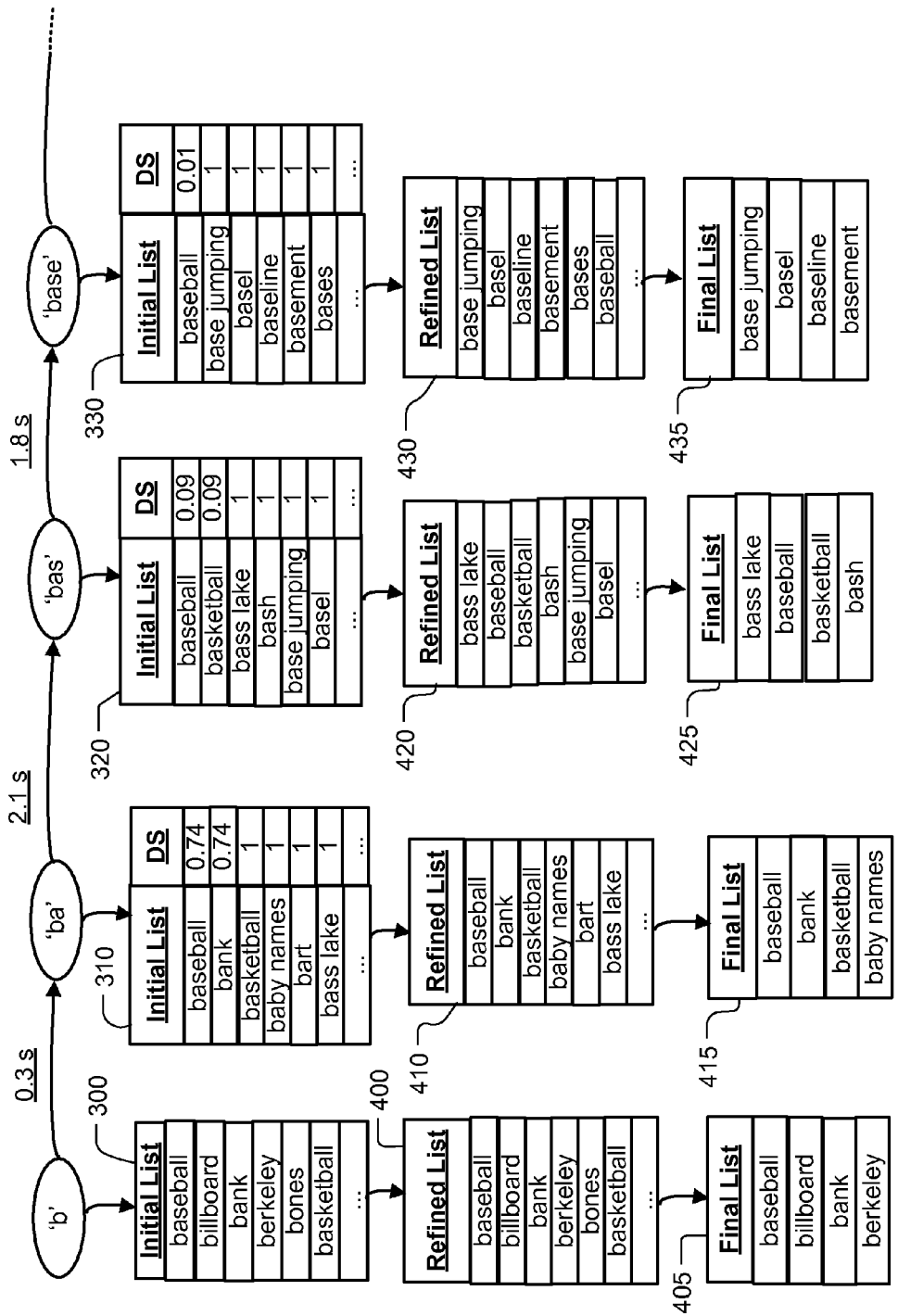
FIG. 4 illustrates an example of refining lists of query completions across a series of partial queries during the query input process of a user.

FIG. 4 illustrates an example of refining lists of query completions across a series of partial queries during the query input process of a user. The demotion scores are calculated in the example using above Eq. 1, with λ equal to 1. Alternatively, the demotion scores may be calculated using other techniques. In this example, the typing sequence includes the sequential entry of the characters "b"-"a"-"s"-"e" by the user.

In this example, the user first enters a single character "b" that represents a first partial query. In response, the initial list 300 of associated with the partial query "b" are obtained. Since the partial query "b" is the first partial query of the current query input process, the positions of the query completions in the refined list 400 are the same as in the initial list 300. In this example, the four highest ranked query completions in the refined list 400 are then selected as the final list 405 of query completions and provided for display to the user.

In this example, the user enters an additional character "a" 0.3 seconds after the display of the final list 405. In response, the initial list 310 of query completions associated with the partial query "ba" are obtained. As shown in this example, the query completions "baseball" and "bank" were included in the final list 405 of query completions for the partial query "b". However, the relatively short amount of time of 0.3 seconds between display of the final list 405 and the user's entry of the additional character "a", indicates a relatively low likelihood that the user observed and decided not to select from the final list 405. As a result, the calculated demotion scores (DS) for the previously displayed query completions "baseball" and "bank" are still relatively high, such that the demotion scores are insufficient to modify the positions of the query completions within the initial list 310. As a result, the positions of the query completions within the refined list 410 are the same as in the initial list 310. The four highest ranked query completions in the refined list 410 are then selected as the final list 415 and provided for display to the user.

In this example, the user then enters an additional character "s" 2.1 seconds after the display of the final list 415. In response, the initial list 320 of query completions for the partial query "bas" is obtained. In this example, the query completions "baseball" and "basketball" were included the final list 415 of query completions provided for the partial query "ba". Furthermore, the relatively long pause of 2.1 seconds between display of the final list 415 and the user' entry of the additional character "s", indicates a relatively high likelihood that the user observed the query completions in the final list 415, and decided not to select from it. As a result, the updated demotion scores for the query completions "baseball" and "basketball" are now relatively low. These updated demotion scores are sufficient to move the position of the query completion "baseball" from the highest ranked position in the initial list 320, the second position in the refined list 420. Similarly, position of the query completion "basketball" has changed from the second position in the initial list 320, to the third position in the refined list 420. The four highest ranked query completions in the refined list 420 are then selected as the final list 425 and provided for display to the user.

In this example, the user then enters an additional character "e" 1.8 seconds after the display of the final list 425. In response, the initial list 330 of query completions for the partial query "base" is obtained. The relatively long pause of 1.8 seconds indicates a relatively high likelihood that the user observed the final list 425, and decided not to select from it. As a result, the demotion score for the query completion "baseball" within the initial list 330 is updated to reflect the relatively high likelihood that the query completion "baseball" does not represent the informational need of the user. The updated demotion score for "baseball" is sufficient to move it from the highest ranked position in the initial list 330, to the sixth position in the refined list 430. The four highest ranked query completions in the refined list 430 are then selected as the final list 435 and provided for display to the user. As shown in FIG. 4, the query completion "baseball" is not included in the final list 435.

Figure 5:
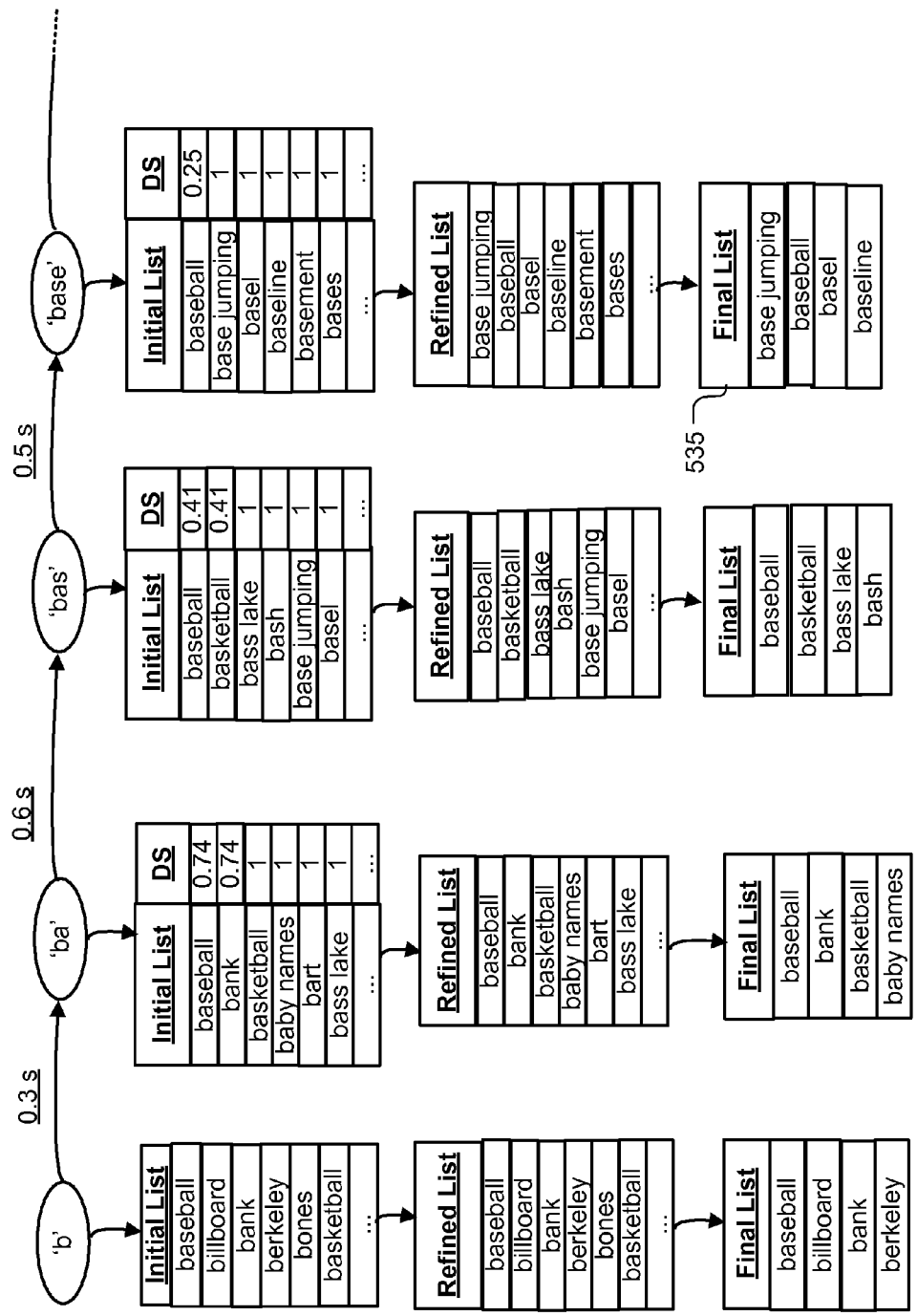
FIG. 5 illustrates a second example of refining lists of query completions across a series of partial queries during the query input process of another user.

FIG. 5 illustrates a second example of refining lists of query completions across a series of partial queries during the query input process of another user. The example in FIG. 5 is for the same sequence of characters "b"-"a"-"s"-"e". However, in contrast to the relatively long pauses in the example of FIG. 4 between entry of characters "a" and "s", and between entry of characters "s" and "e", in the example in FIG. 5 each of the characters "b"-"a"-"s"-"e" are entered rather quickly. The quick entry of successive query characters indicates a lower likelihood that the user observed and decided not to select from the already displayed query completions within the final lists. As a result, in FIG. 5 the demotion score for the query completion "baseball" of the partial query "base" is much smaller that it was for the example in FIG. 4. This reflects the increased likelihood that the query completion "baseball" may still represent the informational need of the user. As a result, the final list 535 of query completions for the partial query "base" includes the query completion "baseball" in the second position. This is in contrast to the final list 435 in FIG. 4, in which the query completion "baseball" was not even included within the final list 435.

Figure 6:
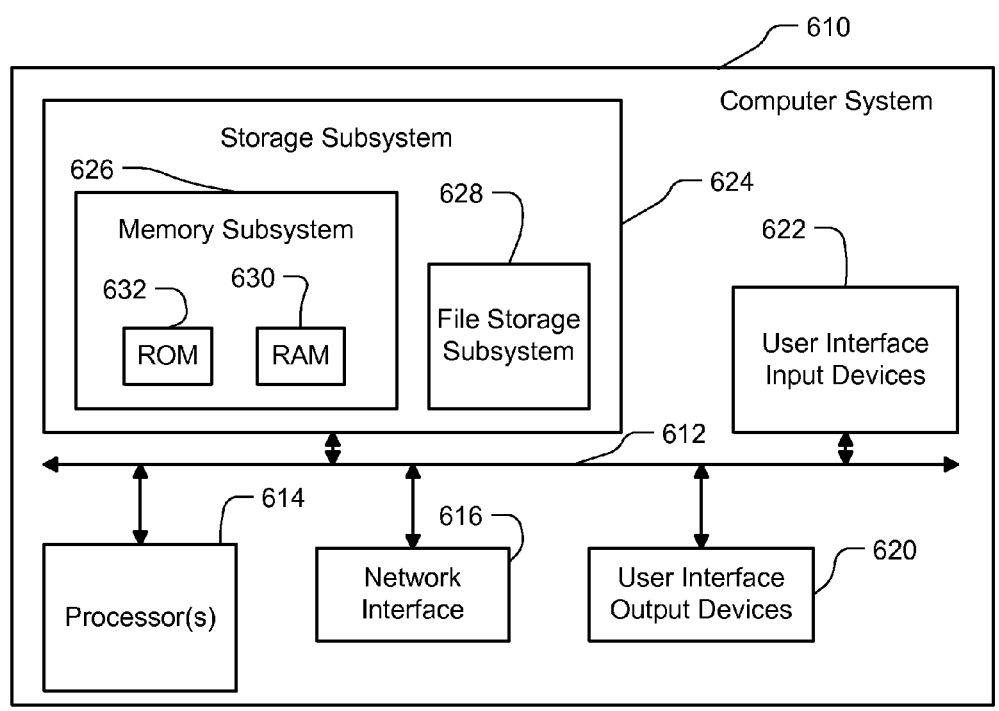
FIG. 6 is a block diagram of an example computer system.

FIG. 6 is a block diagram of an example computer system. Computer system 610 typically includes at least one processor 614 which communicates with a number of peripheral devices via bus subsystem 612. These peripheral devices may include a storage subsystem 624, comprising for example memory devices and a file storage subsystem, user interface input devices 622, user interface output devices 620, and a network interface subsystem 616. The input and output devices allow user interaction with computer system 610. Network interface subsystem 616 provides an interface to outside networks, including an interface to communication network 140, and is coupled via communication network 140 to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include possible types of devices and ways to input information into computer system 610 or onto communication network 140.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein, including the logic to calculate demotion scores for past suggestions according to the processes described herein. These software modules are generally executed by processor 614 alone or in combination with other processors.

Memory 626 used in the storage subsystem can include a number of memories including a main random access memory (RAM) 630 for storage of instructions and data during program execution and a read only memory (ROM) 632 in which fixed instructions are stored. A file storage subsystem 628 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem in the storage subsystem 624, or in other machines accessible by the processor.

Bus subsystem 612 provides a mechanism for letting the various components and subsystems of computer system 610 communicate with each other as intended. Although bus subsystem 612 is shown schematically as a single bus, alternative embodiments of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating the preferred embodiments. Many other configurations of computer system 610 are possible having more or less components than the computer system depicted in FIG. 6.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for dynamically refining lists of query completions, systems including logic and resources to dynamically refine lists of query completions, systems that take advantage of computer-assisted methods for dynamically refining lists of query completions, media impressed with logic to dynamically refining lists of query completions, data streams impressed with logic to dynamically refine lists of query completions, or computer-accessible services that carry out computer-assisted methods for dynamically refining lists of query completions. It is contemplated that modifications and combinations will readily occur to those skilled in the art, which modifications and combinations will be within the scope of the following claims.

We claim as follows:

1. A method comprising:
receiving a sequence of one or more characters entered into a search field on a computing device, wherein the sequence of characters represents a first partial query;
providing a first list of query completions for the first partial query for display on the computing device;
receiving one or more additional characters entered into the search field upon display of the first list, wherein the sequence of characters and the additional characters cumulatively represent a second partial query;
obtaining a second list of query completions for the second partial query;
identifying, for each of one or more query completions in the second list, an initial ranking score for the query completion for the second partial query;
identifying one or more query completions in the second list that appear in the first list;
calculating demotion scores for the identified query completions, wherein a demotion score for a particular identified query completion is a function of both:
the initial ranking score for the particular identified query completion, and
a value that is based on a period of time between when the first list was displayed and when the additional characters were entered;
using the demotion scores to demote one or more of the identified query completions to a lesser position within the second list, thereby forming a refined second list; and
providing the refined second list of query completions for the second list of query completions for display on the computing device.

2. The method of claim 1, wherein the demotion scores are further based on respective positions of the identified query completions within the displayed first list of query completions.

3. The method of claim 2, wherein:
the first list of query completions are provided for display within a menu beneath the search field; and
the demotion score for the particular identified query completion is based on whether the particular identified query completion was provided for display at or above a threshold position within the menu.

4. The method of claim 3, wherein the threshold position is a second position beneath the search field.

5. The method of claim 1, wherein the demotion score for the particular query completion is based on whether the period of time that the first list was displayed exceeds a threshold time.

6. The method of claim 1, further comprising:
receiving one or more further characters entered into the search field upon display of the refined second list, wherein the second partial query and the further characters represent a third partial query;
obtaining a third list of query completions for the third partial query;
identifying one or more query completions in the third list that appear in the refined second list;
calculating demotion scores for the identified query completions in the third list, wherein a demotion score for a given identified query completion in the third list is based at least in part on a second period of time between when the refined second list was displayed and when the further characters were entered;
using the demotion scores for the identified completions in the third list to demote one or more of the identified query completions to a lesser position in the third list, thereby forming a refined third list; and
providing the refined third list of query completions for display on the computing device.

7. The method of claim 6, wherein the given identified query completion in the third list further appears in the first list, and the demotion score for the given identified query completion is further based on the period of time between when the first list was displayed and when the additional characters were entered.

8. The method of claim 1, wherein the one or more additional characters is a single character.

9. A non-transitory computer readable storage medium storing computer instructions executable by a processor to perform a method comprising:
receiving a sequence of one or more characters entered into a search field on a computing device, wherein the sequence of characters represents a first partial query;
providing a first list of query completions for the first partial query for display on the computing device;
receiving one or more additional characters entered into the search field upon display of the first list, wherein the sequence of characters and the additional characters cumulatively represent a second partial query;
obtaining a second list of query completions for the second partial query;
identifying, for each of one or more query completions in the second list, an initial ranking score for the query completion for the second partial query;
identifying one or more query completions in the second list that appear in the first list;
calculating demotion scores for the identified query completions, wherein a demotion score for a particular identified query completion is a function of both:
the initial ranking score for the particular identified query completion, and
a value that is based on a period of time between when the first list was displayed and when the additional characters were entered;
using the demotion scores to demote one or more of the identified query completions to a lesser position within the second list, thereby forming a refined second list; and
providing the refined second list of query completions for the second list of query completions for display on the computing device.

10. The non-transitory computer readable storage medium of claim 9, wherein the demotion scores are further based on respective positions of the identified query completions within the displayed first list of query completions.

11. The non-transitory computer readable storage medium of claim 9, wherein the demotion score for the particular query completion is based on whether the period of time that the first list was displayed exceeds a minimum threshold time.

12. A system including memory and one or more processors operable to execute instructions, stored in the memory, including instructions to:
receive a sequence of one or more characters entered into a search field on a computing device, wherein the sequence of characters represents a first partial query;
provide a first list of query completions for the first partial query for display on the computing device;
receive one or more additional characters entered into the search field upon display of the first list, wherein the sequence of characters and the additional characters cumulatively represent a second partial query;
obtain a second list of query completions for the second partial query;
identify, for each of one or more query completions in the second list, an initial ranking score for the query completion for the second partial query;
identify one or more query completions in the second list that appear in the first list;
calculate demotion scores for the identified query completions, wherein a demotion score for a particular identified query completion is a function of both:
the initial ranking score for the particular identified query completion, and
a value that is based on a period of time between when the first list was displayed and when the additional characters were entered;
use the demotion scores to demote one or more of the identified query completions to a lesser position within the second list, thereby forming a refined second list; and
provide the refined second list of query completions for the second list of query completions for display on the computing device.

13. The system of claim 12, wherein the demotion scores are further based on respective positions of the identified query completions within the displayed first list of query completions.

14. The system of claim 13, wherein:
the first list of query completions was provided for display within a menu beneath the search field; and
the demotion score for the particular identified query completion is based on whether the particular identified query completion was displayed at or above a threshold position within the menu.

15. The system of claim 14, wherein the threshold position is a second position beneath the search field.

16. The system of claim 12, wherein the demotion score for the particular query completion is based on whether the period of time that the first list was displayed exceeds a minimum threshold time.

17. The system of claim 12, further comprising instructions to:
receive one or more further characters entered into the search field upon display of the refined second list, wherein the second partial query and the further characters represent a third partial query;

obtain a third list of query completions for the third partial query;

identify one or more query completions in the third list that appear in the refined second list;

calculate demotion scores for the identified query completions in the third list, wherein a demotion score for a given identified query completion in the third list is based at least in part on a second period of time between when the refined second list was displayed and when the further characters were entered;

use the demotion scores for the identified completions in the third list to demote one or more of the identified query completions to a lesser position in the third list, thereby forming a refined third list; and provide the refined third list of query completions for display on the computing device.

18. The system of claim 17, wherein the given identified query completion in the third list further appears in the first list, and the demotion score for the given identified query completion is further based on the period of time between when the first list was displayed and when the additional characters were entered.

19. The system of claim 12, wherein the one or more additional characters is a single character.

* * * * *